(12) United States Patent
Zhao et al.

(10) Patent No.: US 8,183,300 B2
(45) Date of Patent: May 22, 2012

(54) METHOD FOR PRODUCING NANOPARTICLES OF A SELECTED SIZE

(75) Inventors: Julia Xiaojun Zhao, Grand Forks, ND (US); Yuhui Jin, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 424 days.

(21) Appl. No.: 12/378,116

(22) Filed: Feb. 11, 2009

(65) Prior Publication Data

US 2009/0258956 A1    Oct. 15, 2009

Related U.S. Application Data

(60) Provisional application No. 61/027,528, filed on Feb. 11, 2008.

(51) Int. Cl.
*B82B 3/00*    (2006.01)

(52) U.S. Cl. ..................................................... 516/111

(58) Field of Classification Search .................... 516/111
See application file for complete search history.

(56) References Cited

U.S. PATENT DOCUMENTS

2005/0063898 A1*   3/2005   Ja Chisholm ................. 423/608
2006/0228554 A1    10/2006  Tan
2007/0059544 A1    3/2007   Xiong

OTHER PUBLICATIONS

Eastoe et al. (Recent advances in nanoparticle synthesis with reversed micelles, Advances in Colloid and Interface Science 128-130 (May 15, 2006).*
Bagwe, Rahul P. et al., Optimization of Dye-Doped Silica Nanoparticles Prepared Using a Reverse Microemulsion Method, Sep. 14, 2004, Langmuir, vol. 20, Issue 19, pp. 8336-8342.
Kitchens, Christopher L. et al., Solvent Effects on the Growth and Steric Stabilization of Copper Metallic Nanoparticles in AOT Reverse Micelle Systems, Oct. 16, 2003, Journal of Physical Chemistry B, vol. 107, Issue 41, pp. 11331-11338.
International Search Report, mailed Sep. 28, 2009.

* cited by examiner

*Primary Examiner* — Ling Choi
*Assistant Examiner* — Chun-Cheng Wang
(74) *Attorney, Agent, or Firm* — Kinney & Lange, P.A.

(57) ABSTRACT

A method for producing nanoparticles of a selected size includes selecting an organic solvent based upon a molar volume of the organic solvent, the selected nanoparticle size, and a known relationship between the molar volume and the selected nanoparticle size, and producing nanoparticles having the selected size in a water-in-oil microemulsion comprising the selected organic solvent.

20 Claims, 5 Drawing Sheets

METHOD FOR PRODUCING NANOPARTICLES OF A SELECTED SIZE

CROSS-REFERENCE TO RELATED APPLICATION(S)

This application claims the benefit of U.S. Provisional Application No. 61/027,528 filed on Feb. 11, 2008, for "Method for Production of Targeted Sized Nanoparticles" by Julia Xiaojun Zhao and Yuhui Jin, which is incorporated by reference.

STATEMENT OF GOVERNMENT INTEREST

This invention was made with government support under Contract No. CHE0616878 awarded by the National Science Foundation. The government has certain rights in the invention.

BACKGROUND

The size of silica-based nanoparticles affects their physical, chemical, electrical and optical properties. Traditionally, micrometer sized silica particles have been used as catalyst substrates, pigments, stationary phase in chromatography columns, etc. Recently, nanometer sized silica nanoparticles have developed rapidly and become an important class of nanomaterial. By themselves, the size-dependent properties of pure, nanoscale silica nanoparticles are not remarkable. However, when these nanoparticles are combined with various functional molecules, the impact of size becomes significant—especially for analysis applications. The role of silica nanoparticles in these cases is usually as a supporting or entrapping matrix. Two major reasons make silica a useful matrix in this regard and particularly relevant in bioapplications. First, the surface of silica nanoparticles is easily modified based on well-established chemistry. With appropriate surface and internal functionality, these nanoparticles can be linked to a variety of biorecognition agents in many different ways (e.g., antibodies, protein complexes, nucleic acids, etc.). Second, the negatively-charged silica matrix itself provides numerous electrostatic binding sites to physically dope (i.e., adsorb) a wide variety of positively-charged molecules. When doped with bioactive molecules and medicines, these nanoparticles can serve as drug delivery vehicles capable of controlling the quantity and time of release. When doped with dye molecules, these nanoparticles become intensely luminescent reagents capable of sensitively signaling biological targets.

Variations in the size of luminescent silica nanoparticles are needed for effective imaging of a wide variety of biological samples and processes. In cell imaging, the recognition reaction occurs either on the cell surface or inside the membrane. When a nanoparticle is used as a tag, the size of the nanoparticles may affect whether it can reach a target site or not, such as a cell nucleus, for example. Furthermore, the size of a luminescent silica nanoparticle primarily determines its luminescence intensity at the optimal concentration of dye molecules. To enhance the detection levels to meet the required sensitivity of a measurement, various sizes of luminescent nanoparticles are essential.

The size-dependent properties of nanoparticles are varied but can be tied to three mainly beneficial effects. In general, smaller sized nanoparticles provide a higher surface area to volume ratio, faster reactivity and greater mobility than their larger counterparts. However, in some cases, the small size of nanoparticles allows for their enhanced penetration into biological and environmental substrates, which can sometimes lead to negative effects such as cell toxicity or environmental pollution. Thus, in some cases, larger sized nanoparticles are needed for achieving desired properties. Even a small change in size can result in a large difference in several important properties of nanoparticles. Therefore, the precise size of the nanoparticles on a continuous scale is needed for different applications.

The common methods of synthesizing silica nanoparticles are the Stöber method and the water-in-oil microemulsion method. Although these methods have led to production of nanoparticles of various sizes, the sizes are limited, discrete, and not precisely tunable on a continuous range.

SUMMARY

A method for producing nanoparticles of a selected size includes selecting an organic solvent based upon a molar volume of the organic solvent, the selected nanoparticle size, and a known relationship between the molar volume and the selected nanoparticle size, and producing nanoparticles having the selected size in a water-in-oil microemulsion comprising the selected organic solvent.

DETAILED DESCRIPTION

The methods of the present disclosure are based on the discovery that nanoparticle size can be controlled by the particular organic solvent or blend or organic solvents used in a water-in-oil microemulsion synthesis process. In particular, it has been discovered that molar volume of the organic solvent/s has a relationship to the resulting nanoparticle size. A method of producing nanoparticles of a selected or desired size in a water-in-oil microemulsion includes selecting an organic solvent for use in the microemulsion based upon the molar volume of the solvent and a known relationship between the molar volume and the selected or desired nanoparticle size. A precise and continuous range of nanoparticle sizes may be produced based on an average molar volume of two or more solvents selected for the microemulsion, rather than limited by the specific molar volume of just one solvent. Here, molar volume is the volume occupied by one mole of an organic solvent molecule at a given temperature and pressure, and will increase with an increase in the alkane chain length, or the molecular size, of the molecule. Thus, under the method of the present disclosure, the size of the nanoparticle produced in a water-in-oil microemulsion can be precisely controlled based on the alkane chain length of the organic solvent or solvents used in the microemulsion, with larger nanoparticles produced as the alkane chain length and molar volume increases as described in more detail below.

A water-in-oil microemulsion is an isotropic and thermodynamically stable single-phase solution. It consists of a small amount of water, a large volume of organic solvent (oil), and a surfactant. The surfactant molecules lower the interfacial tension between water and the organic solvent, resulting in the formation of a transparent solution. Water droplets are formed in the bulk organic solvent and serve as nanoreactors for the synthesis of nanoparticles from various precursors. Tetraethylorthosilicate is a typical water soluble precursor for the synthesis of silica nanoparticles. Upon the polymerization of tetraethylorthosilicate, a silica core is formed in the water droplet. As the polymerization is carried out, the silica core grows, and finally a stable nanoparticle is produced in the water droplet. Nanoparticles are not limited to silica based particles and other like materials may be used such as tetra-tert-butyl orthotitanate for forming titanium dioxide nanoparticles, as an example.

The organic solvent, often an alkane, is an essential component to form a stable water-in-oil microemulsion. It was surprisingly discovered that the molecular size or molar volume of the organic solvent molecule has an important effect on the size of the nanoparticle. Prior to this discovery, parameters such as the water to surfactant ratio, the type of surfactant used, the amount of tetraethylorthosilicate, and the amount of catalyst (such as ammonia hydroxide) were altered to produce nanoparticles of various sizes, but the effect of the molar volume of the organic solvent was ignored and unknown. However, it was discovered that by using a variety of organic solvents having differing molar volumes, a significant change could be made in the size of the nanoparticle produced as a function of the molar volume of the solvents. Furthermore, unlike prior methods, the method of the present disclosure relying on the average molar volume created by two or more organic solvents was found to produce nanoparticles of any desired size along a smooth size continuum, rather than the limited and non-continuous nature of sizes produced under prior methods. Additionally, the size of nanoparticles produced under the method of the present disclosure produced nanoparticles having an extremely low standard deviation for each size. The theoretical principle of this discovery can be described as follows.

The size of nanoparticles produced by the water-in-oil microemulsion method is directly influenced by the water droplet size. Thus, to explain the effect of molar volume of the organic solvent on nanoparticle size, it is necessary to explain the same effect on water droplet size in the water-in-oil microemulsion. For this purpose, a simple physical model was adopted which describes the geometric constraints imposed on water droplets of a stable water-in-oil microemulsion. Equation (1) describes that the radius (R) of a water droplet in related to three factors when R is below the critical value.

$$R = \frac{3\phi}{C_S \Sigma} \quad (1)$$

The geometric constraints in this model are the number of surfactant molecules per unit volume ($C_S$) and the area occupied per surfactant molecule ($\Sigma$). Also considered is the volume fraction ($\phi$) of the dispersed (water) phase. The term $\phi/C_S$ is usually referred to as the water to surfactant ratio and is fixed by stoichiometry. However, the $\Sigma$ term provides useful insight into the effect of organic solvent, particularly through its changes to the surface area occupied by surfactant molecules.

Figure 1:
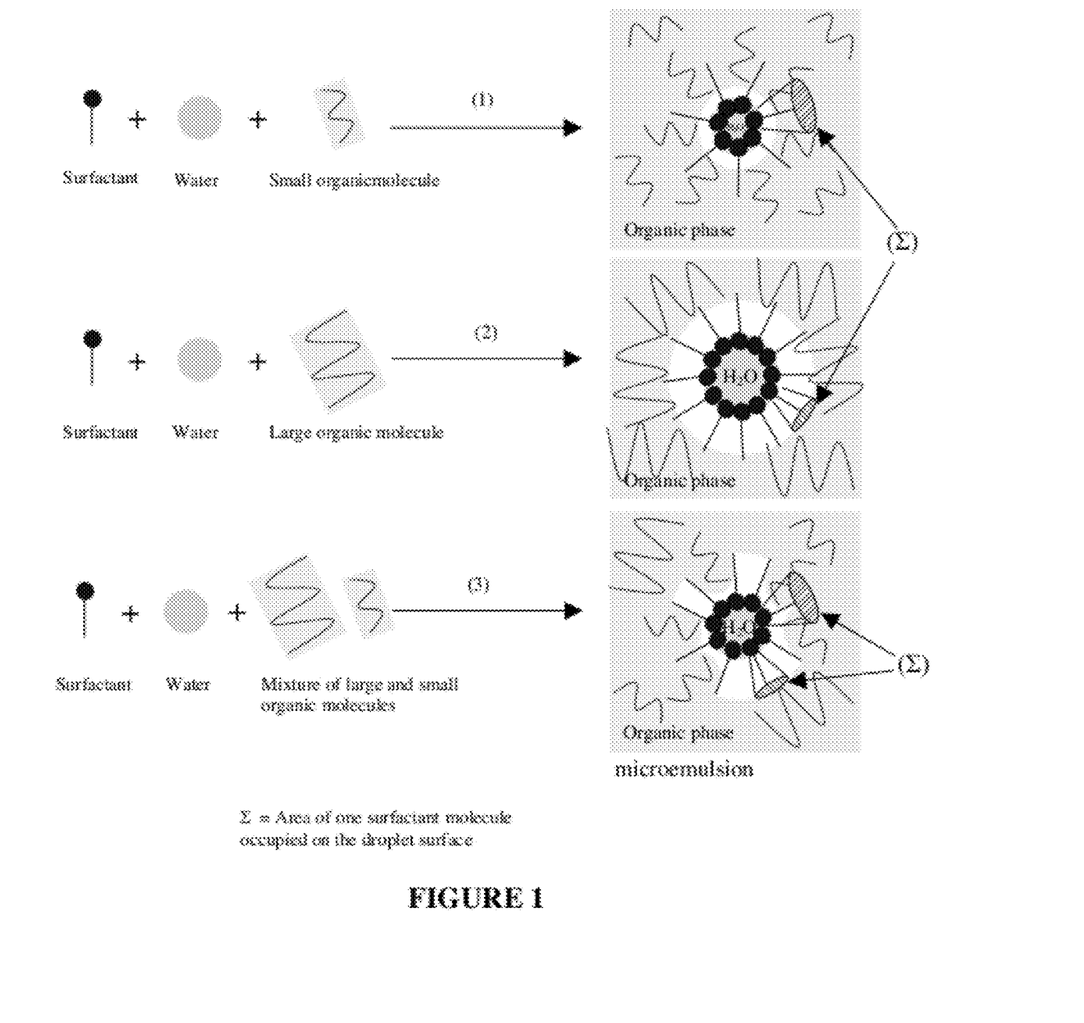
FIG. 1 is a diagram that illustrates the effect of organic solvents of various sizes on the dynamic size of a water droplet in a water-in-oil microemulsion.

FIG. 1 shows the effect that organic solvents have on water droplet size in a water-in-oil microemulsion through shaping the area $\Sigma$ occupied by each surfactant molecule. If organic solvent molecules partially or entirely penetrate into the hydrophobic layer of surfactant on a water droplet surface, $\Sigma$ will vary based on the extent of penetration and the molar volume of the organic solvent molecule(s). A small organic molecule can penetrate into the surfactant layer much deeper than a large molecule, resulting in a larger area per surfactant occupied, represented by the hatched circle in FIG. 1, part (1) and labeled $\Sigma$. Conversely, a larger organic molecule cannot easily penetrate into a surfactant layer, resulting in a smaller $\Sigma$ as shown in FIG. 1 part (2). The combination of a larger and a smaller organic molecule can produce variable $\Sigma$ values based on the ratio of two molecules and their average molar volume, as shown in FIG. 1 part (3). According to equation (1), if $\phi/C_S$ is fixed, R is inversely proportional to $\Sigma$. From this simple physical model, it can be seen that difference in molar volume of an organic solvent can change the size of water droplets, and thus also the change of the size of silica nanoparticles.

In addition to the above effect, the molar volume of an organic solvent also affects the number of silica cores formed in the water-in-oil microemulsion synthesis. As the amount of tetraethylorthosilicate, water-to-surfactant ratio, and the type of surfactant and co-surfactant are fixed, the size of the silica nanoparticles is primarily determined by the number of the silica cores formed in the initial state. Because nearly all tetraethylorthosilicate can be polymerized and the amount of tetraethylorthosilicate is fixed, the more silica cores formed the smaller the final size of the silica nanoparticles. Based on the nanoparticle formation process previously described, the number of water droplets determines the number of silica cores, and the ultimate size of the silica nanoparticles is limited by the boundary of the water droplet. Thus, both the number and the size of water droplets in the microemulsion are determining factors for the size of silica nanoparticles.

Figure 2:
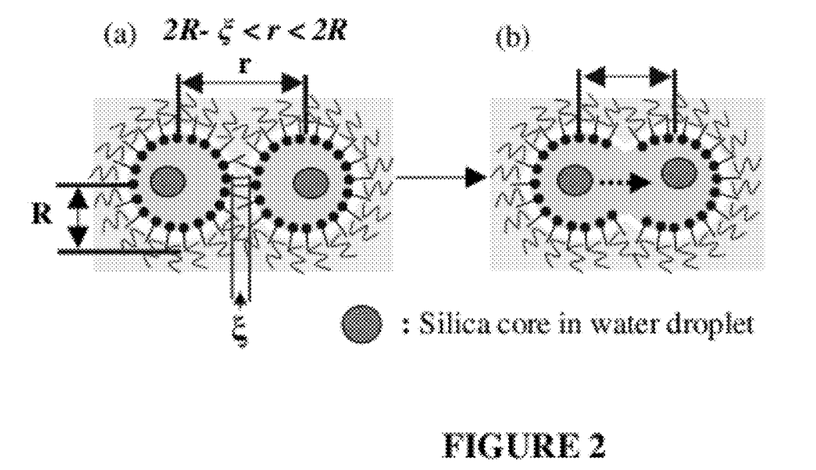
FIG. 2 is a diagram that illustrates the effect of organic solvent on the potential for inter-droplet percolation in a water-in-oil microemulsion.

FIG. 2 shows the effect of organic solvent on the potential for inter-droplet percolation in a water-in-oil microemulsion. After the initial silica cores are formed, the nanoparticles start growing. Occasionally, the collision of two water droplets may result in silica core transfer between the water droplets as shown in FIG. 2. This process is referred to as inter-droplet percolation. The percolation causes the aggregation of silica cores and leads to the reduction of the number of silica cores. Consequently, the final size of silica nanoparticles becomes larger, and the nanoparticles have a broad size distribution. In a water-in-oil microemulsion, the molar volume of an organic solvent affects the potential of inter-droplet percolation as described in equation (2).

$$U(r)=0, r>2R$$

$$U(r)=-kT\Delta\rho(2R-r)^2(2R+r/2)/6,\ 2R-\xi<r<2R$$

$$U(r)=\infty,\ r<2R-\xi \quad (2)$$

Here, U(r) is the potential of inter-droplet percolation, r is the distance between the two water droplets, R is a radius of the water droplet, k is the Boltzmann constant, T is the Kelvin temperature, and $\xi$ is a parameter to characterize the penetrable length of the interfacial layer. $\Delta\rho$ is related to molar volume of the organic solvent. A large molar volume corresponds to a large $\Delta\rho$ value. In the range of $2R-\xi<r<2R$ as shown in FIG. 2, the value of (2R-r) is very small. However, the potential for percolation will increase as the size of the droplet (R) increases. Therefore, the inter-droplet percolation occurs easily in organic solvent having a large molar volume when the inter-droplet distance (r) is in the range of 2R−ξ<r<2R as shown in FIG. 2. Therefore, it follows that the size of a silica nanoparticle will rise with an increase of the molar volume of an organic solvent used in the water-in-oil microemulsion.

Under prior water-in-oil microemulsion methods, only a non-continuous spectrum of nanoparticle sizes could be produced by adjusting water to surfactant ratios, the type of surfactant used, the amount of tetraethylorthosilicate, and the amount of catalyst (such as ammonia hydroxide), for example. However, the method of the present disclosure is able to overcome this limitation by mixing two or more organic solvents to produce a continuous range of U(r) and generate a continuous spectrum of nanoparticles that are correlated to the U(r). Particles of a desired size are generated by mixing two or more organic solvents at a specific percentage where each solvent has a different molar volume to produce a desired average molar volume. Under this method, a particle of any desired size is produced by fine-tuning the mixture of the two organic solvents, and a wider range of specific sized particles is available using a wide range of organic solvents having differing molar volumes. For example, as described in the examples below, nanoparticles from about 20 nm to about 100 nm can be produced including all sizes in between.

EXAMPLE 1

Synthesis of the Luminescent Silica Nanoparticles in a Quaternary Water-in-Oil Microemulsion Luminescent silica nanoparticles were synthesized using different organic solvents and surfactants in the water-in-oil microemulsion, and were doped with fluorescent $Ru(bpy)_3$. The procedure was similar to standard water-in-oil microemulsion methods except for varying the organic solvents. Briefly, in the quaternary system, besides water and an organic solvent, Triton X-100 and n-hexanol were employed as a surfactant and a co-surfactant, respectively. Triton X-100 is octylphenol ethylene oxide condensate, having the chemical formula $C_{14}H_{22}O(C_2H_4O)_n$ where n=9-10. 7.5 ml of an organic solvent, 1.8 ml of n-hexanol and 1.77 ml of Triton X-100 were mixed together under vigorous stirring for 20 min. Then, 480 µl of 1.70 mM $Ru(bpy)_3$ aqueous solution, 80 µl of tetraethylorthosilicate and 60 µl of 28% ammonia hydroxide were added in 20 min intervals. The reaction proceeded under darkness for 24 h. Next, 20 µl of tetraethylorthosilicate and 20 µl of N-(trimethoxysilylpropyl)-ethylenediamine, triacetic acid trisodium salt (45% in water) were added to the microemulsion for an additional 24 h to form a —COOH group on the nanoparticle surface to prevent aggregation. Finally, the nanoparticles were collected by centrifuging at 11,000 rpm for 15 min. A Hitachi 7500 transmission electron microscope (TEM) was used to take images of the developed nanoparticles.

EXAMPLE 2

Synthesis of the Luminescent Silica Nanoparticles in a Ternary Microemulsion

A ternary microemulsion is composed of three components: a surfactant (NP-5), an organic solvent, and the water. NP-5 is a polyoxyethylene nonyl phenol ether, having the chemical formula $C_{15}H_{24}O(C_2H_4O)_5$. 10 ml of organic solvents and 460 µl of NP-5 were combined and stirred for 20 min. Then, 90 µl of 1.70 M $Ru(bpy)_3$ aqueous solution was added. The subsequent steps were the same as for the quaternary microemulsion described in Example 1.

EXAMPLE 3

Controlling the Size of the Silica Nanoparticles Using a Single Organic Solvent in a Water-in-Oil Microemulsion TABLE 1 shows six organic solvents with different molar volumes used for the synthesis of silica nanoparticles in a water-in-oil microemulsion.

TABLE 1

| | Physical properties | | Diameter of Nanoparticles (nm) | |
| --- | --- | --- | --- | --- |
| Organic phase | Molar volume (mL/mol) | Dielectric constant | Quaternary system | Ternary system |
| A) Cyclohexane | 108 | 2.02 | 53 ± 3 | 26 ± 2 |
| B) n-Pentane | 115 | 1.84 | 59 ± 5 | 20 ± 1 |
| C) n-Hexane | 131 | 1.89 | 71 ± 5 | 44 ± 4 |
| D) n-Heptane | 147 | 1.92 | 74 ± 2 | 44 ± 6 |
| E) n-Decane | 195 | 1.99 | 85 ± 4 | N/A |
| F) n-Hexadecane | 293 | 2.05 | 108 ± 8 | N/A |

Figure 3:
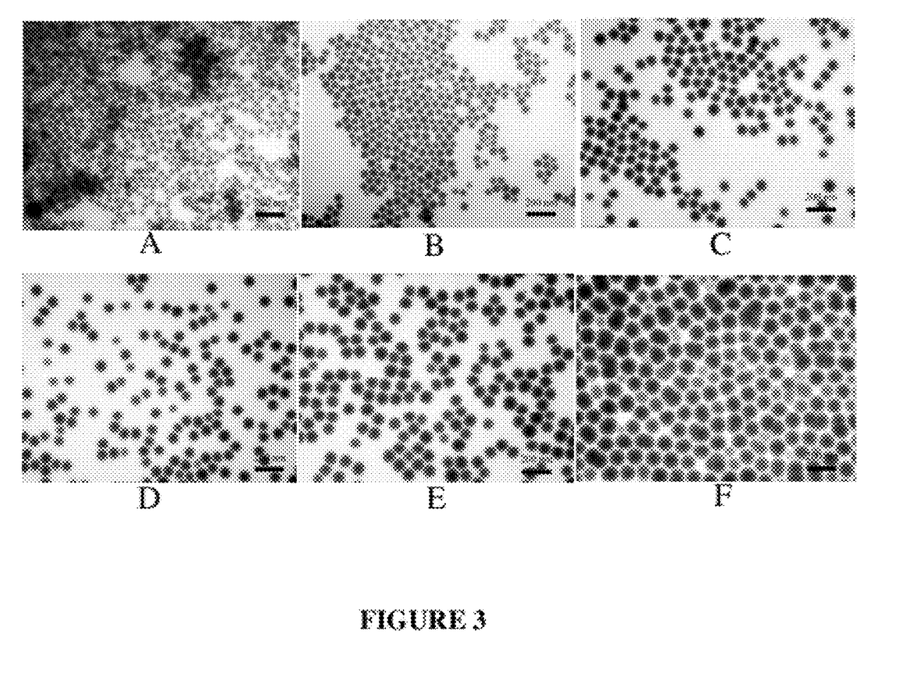
FIG. 3 shows transmission electron microscope images of nanoparticles synthesized with various organic solvents in a quaternary water-in-oil microemulsion system.

FIG. 3 includes transmission electron microscope images A through F showing nanoparticles produced by each quaternary water-in-oil microemulsion represented by A through F in TABLE 1 above. A common quaternary water-in-oil microemulsion contains four primary components: Triton X-100, n-hexanol, water and an organic solvent. All synthesis conditions were fixed except for the usage of different organic solvents. As shown in TABLE 1, A through F, and corresponding FIG. 3 photographs A through F, as the molar volume of a single organic solvent increased from 108 mL/mol (cyclohexane) to 293 mL/mol (n-hexadecane), the nanoparticle size increased significantly from 53±3 nm to 108±8 nm. The higher the molar volume of the organic solvent, the larger the nanoparticle produced. In contrast, when the molar volume of the organic solvent differed only slightly, such as with n-pentane (115 mL/mol) and cyclohexane (108 mL/mol), the sizes of resultant nanoparticles changed slightly as well. Similar results were observed for n-hexane and n-heptane. Therefore, the size of the silica nanoparticle can be tuned using the method of the present disclosure by varying the molar volume of an organic solvent. A smaller molar volume of organic solvent produces a smaller size of silica nanoparticle.

Figure 4:
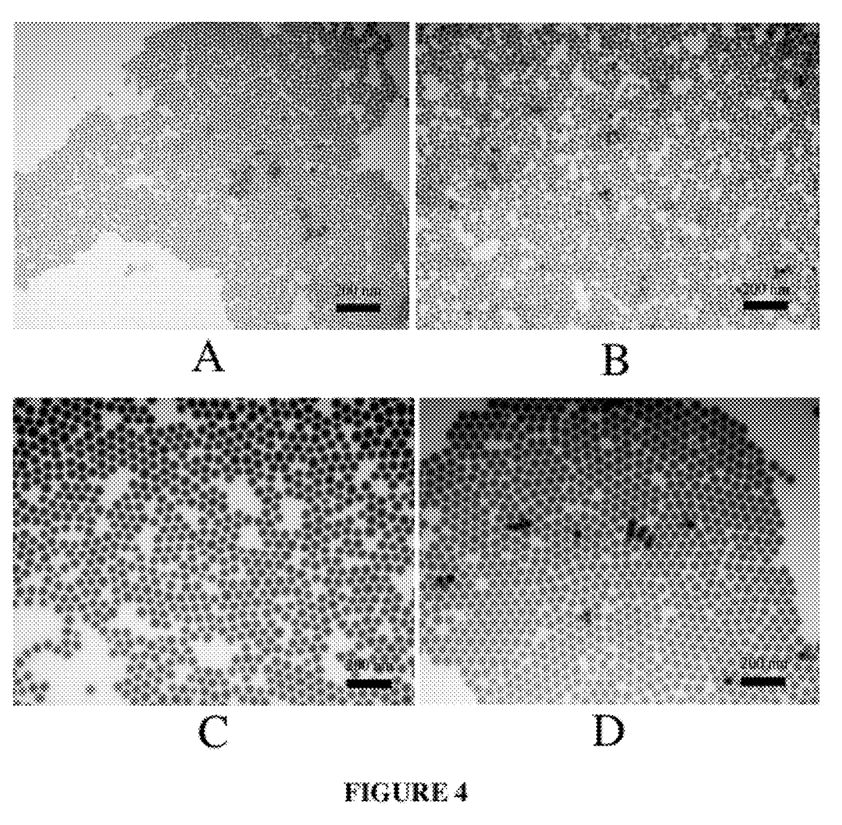
FIG. 4 shows transmission electron microscope images of nanoparticles synthesized with various organic solvents in a ternary water-in-oil microemulsion system.

FIG. 4 includes transmission electron microscope images A through D showing nanoparticles produced by each ternary water-in-oil microemulsion represented by A through D in TABLE 1 above. To further verify the effectiveness of the method of the present disclosure, a ternary water-in-oil microemulsion was employed, which was made up of the water, an organic solvent, and NP-5 as the surfactant. The same six organic solvents evaluated for the quaternary microemulsion were used. However, because there was no co-surfactant to assist in lowering interfacial energy between water and the organic solvent, the two largest alkyl chain organic molecules, n-hexadecane and n-decane, could not form microemulsions. The other four organic solvents did form stable microemulsions and produced uniformly sized nanoparticles as shown in TABLE 1 and FIG. 4. The same trend as in the quaternary microemulsion was observed, that is, as the molar volume of the organic solvent increased, the size of the nanoparticle became larger. However, the average nanoparticle size was smaller than nanoparticles produced with quaternary microemulsions in which Triton X-100 was employed as surfactant. This difference was mainly caused by the different types of surfactants. Overall, these results demonstrated a strong correlation between the molar volume of the organic solvents and nanoparticle size, regardless of the type of water-in-oil microemulsion used in their synthesis.

EXAMPLE 4

Figure 5:
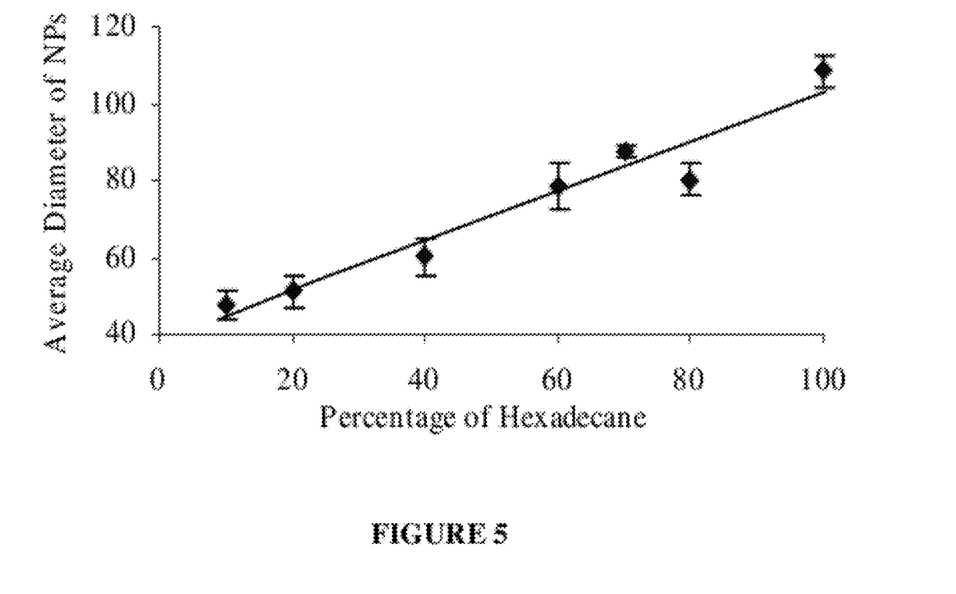
FIG. 5 is a graph showing the average nanoparticle diameters produced from varying mixtures of organic solvents cyclohexane and n-hexadecane.

Fine-Tuning the Size of Silica Nanoparticles Using a Binary Organic Solvent Mixture FIG. 5 is a graph showing the average nanoparticle diameters produced from varying mixtures of organic solvents cyclohexane and n-hexadecane in a binary organic solvent mixture, including the standard deviation bars for each mixture. Although great control over the size of nanoparticles was demonstrated by the method described with reference to the previous examples, the size of silica nanoparticles produced by those methods was still somewhat discrete. Therefore, to tune the size of nanoparticles along a size continuum in nanoscale, binary solvents were employed in the microemulsion. Cyclohexane and n-hexadecane were the smallest and the largest organic molecules among the six chosen solvents in this study. Because their effects on the formation of microemulsion were distinct, they were chosen to evaluate the combinational effect of the two solvents.

A series of mixtures of the two organic solvents was prepared to produce a series of average molar volumes in the water-in-oil microemulsion. A mixture containing 30% (v/v) of cyclohexane and 70% of n-hexadecane produced a transparent and stable microemulsion. Using this ratio, silica nanoparticles with 87±4 nm in diameter were formed. When the volume percentage of hexadecane was reduced and the cyclohexane was increased, the size of the isolated nanoparticles decreased significantly as shown in FIG. 5. When hexadecane constituted less than 20% of the solution, the size of the silica nanoparticles changed very little and remained about 50 nm. Overall, the cyclohexane/n-hexadecane binary solvent system provided an adjustable silica nanoparticle size range of 50-100 nm in diameter by simply changing the volume ratio of n-hexadecane to cyclohexane. When a ternary microemulsion was used, the size of silica nanoparticles could be continuously adjusted in a smaller size range of 20 nm to 50 nm using a binary solvent system. It is very likely that this same size-tuning principle can be extended to other multiple solvent systems for the reverse microemulsion synthesis of other size ranges and with other nanoparticle materials.

With regard to materials used for the examples above, tetraethylorthosilicate (TEOS), and Triton X-100 are available from Aldrich; Ammonia hydroxide (28.0-30.0%), n-hexanol, cyclohexane, n-pentane, n-hexane, n-heptane, n-decane, n-hexadecane are available from Fisher Scientific Co; Tris(2,2'-bipyridyl) ruthenium(II) chloride hexahydrate [Ru (bpy)$_3$]Cl$_2$.6H$_2$O is available from ICN biomedicals Inc; and N-(trimethoxysilylpropyl)-ethylenediamine, triacetic acid tri-sodium salt (45% in water) is available from Gelest Inc.

Although the present invention has been described with reference to preferred embodiments, workers skilled in the art will recognize that changes may be made in form and detail without departing from the spirit and scope of the invention.

The invention claimed is:

1. A method comprising:
   forming a microemulsion comprising a surfactant, an organic solvent, and water, wherein the water forms water droplets in the microemulsion and a size of each water droplet is defined by the equation:

$$R = \frac{3\varphi}{C_s \Sigma},$$

where R is a radius of the water droplet, $\varphi$ is a volume fraction of water in the microemulsion, $C_s$ is an amount of surfactant molecules per unit volume, and $\Sigma$ is an area occupied by each surfactant molecule and is a function of a molar volume of the organic solvent; and
   adding a nanoparticle precursor material to the microemulsion for forming nanoparticles in the water droplets, wherein the nanoparticles formed in each water droplet have a size based on the size of each water droplet.

2. The method of claim 1, wherein the organic solvent is an alkane.

3. The method of claim 1, wherein the organic solvent is selected from a group consisting of cyclohexane, n-pentane, n-hexane, n-heptane, n-decane, and n-hexadecane.

4. The method of claim 1, wherein the nanoparticle precursor material is tetraethylorthosilicate.

5. The method of claim 1, wherein the nanoparticle precursor material is tetra-tert-butyl orthotitanate.

6. The method of claim 1, wherein sizes of the nanoparticles are in the range of about 20 nanometers to about 110 nanometers in diameter.

7. The method of claim 1, wherein the surfactant is octylphenol ethylene oxide condensate having the chemical formula $C_{14}H_{22}O(C_2H_4O)_n$ where n=9-10.

8. The method of claim 1, wherein the surfactant is a polyoxyethylene nonyl phenol ether having the chemical formula $C_{15}H_{24}O(C_2H_4O)_5$.

9. The method of claim 1, wherein the organic solvent comprises a blend of organic solvents having different molar volumes.

10. A method comprising:
   blending a first organic solvent having a first molar volume and a second organic solvent having a second molar volume to produce an organic solvent blend having a third molar volume;
   forming a water-in-oil microemulsion comprising a surfactant, water and the organic solvent blend;
   adding a nanoparticle precursor material to the water-in-oil microemulsion for forming nanoparticles; and
   producing nanoparticles from the nanoparticle precursor material in the water-in-oil microemulsion, wherein nanoparticle size is based on sizes of water droplets in the water-in-oil microemulsion according to the equation:

$$R = \frac{3\varphi}{C_s \Sigma},$$

where R is a radius of the water droplet, $\varphi$ is a volume fraction of water in the microemulsion, $C_s$ is an amount of surfactant molecules per unit volume, and $\Sigma$ is an area occupied by each surfactant molecule and is a function of a third molar volume.

11. The method of claim 10, further comprising selecting the first and second organic solvents based on the nanoparticle size.

12. The method of claim 10, wherein the first and second organic solvents are alkanes.

13. The method of claim 10, wherein the first and second organic solvents are selected from a group consisting of cyclohexane, n-pentane, n-hexane, n-heptane, n-decane, and n-hexadecane.

14. The method of claim 10, wherein the nanoparticle precursor material is tetraethylorthosilicate.

15. The method of claim 10, wherein the nanoparticle precursor material is tetra-tert-butyl orthotitanate.

16. The method of claim 10, wherein the nanoparticle size is in the range of about 20 nanometers to about 110 nanometers in diameter.

17. A method comprising:
selecting a nanoparticle size;
selecting an organic solvent having a molar volume; and
producing a nanoparticle having the selected nanoparticle size in a microemulsion comprising water, surfactant, and the selected organic solvent, wherein the selected nanoparticle size is defined by the equation:

$$R = \frac{3\varphi}{C_s \Sigma},$$

where R is a radius of water droplets within the microemulsion, $\varphi$ is a volume fraction of water in the microemulsion, $C_s$ is an amount of surfactant molecules per unit volume, and $\Sigma$ is an area occupied by each surfactant molecule and is a function of the molar volume of the organic solvent.

18. The method of claim 17, wherein the organic solvent is an alkane.

19. The method of claim 17, wherein the organic solvent is selected from a group consisting of cyclohexane, n-pentane, n-hexane, n-heptane, n-decane, and n-hexadecane.

20. The method of claim 17, wherein the selected nanoparticle size is in the range of about 20 nanometers to about 110 nanometers in diameter.

* * * * *

UNITED STATES PATENT AND TRADEMARK OFFICE
CERTIFICATE OF CORRECTION

PATENT NO. : 8,183,300 B2
APPLICATION NO. : 12/378116
DATED : May 22, 2012
INVENTOR(S) : Julia Xiaojun Zhao and Yuhui Jin It is certified that error appears in the above-identified patent and that said Letters Patent is hereby corrected as shown below:

Col. 8, Line 63
Delete "the"
Insert --a--

Col. 8, Line 67
Delete "a"
Insert --the--

Signed and Sealed this
Ninth Day of April, 2013

Teresa Stanek Rea
*Acting Director of the United States Patent and Trademark Office*